(12) United States Patent
Liu et al.

(10) Patent No.: US 7,315,392 B2
(45) Date of Patent: Jan. 1, 2008

(54) TESTING METHOD FOR EXTENDED CAPABILITIES PORT OF PRINTERS AND FIXTURE THEREOF

(75) Inventors: Win-Harn Liu, Taipei (TW); Jeff Song, Taipei (TW); Zhen Wang, Tianjin (CN); Chiu-Yue Duan, Tianjin (CN)

(73) Assignee: Inventec Corporation, Taipei (TW)

( * ) Notice: Subject to any disclaimer, the term of this patent is extended or adjusted under 35 U.S.C. 154(b) by 999 days.

(21) Appl. No.: 10/420,850

(22) Filed: Apr. 23, 2003

(65) Prior Publication Data

US 2004/0215835 A1 Oct. 28, 2004

(51) Int. Cl.
*G06F 15/00* (2006.01)
*G06K 1/00* (2006.01)
(52) U.S. Cl. .................... 358/1.15; 714/25; 714/43; 399/27
(58) Field of Classification Search ............ 358/1.15; 714/25, 43; 399/27
See application file for complete search history.

(56) References Cited

U.S. PATENT DOCUMENTS

| 5,557,741 | A | * | 9/1996 | Jones | .......................... 714/43 |
| 5,588,114 | A | * | 12/1996 | Bhatia | .......................... 714/25 |
| 5,768,495 | A | * | 6/1998 | Campbell et al. | ............. 714/25 |
| 6,122,755 | A | * | 9/2000 | Chang et al. | .................. 714/25 |
| 7,099,599 | B2 | * | 8/2006 | Karagiannis et al. | ......... 399/27 |

* cited by examiner

*Primary Examiner*—Douglas Q. Tran
*Assistant Examiner*—Satwant Singh
(74) *Attorney, Agent, or Firm*—Birch, Stewart, Kolasch & Birch, LLP

(57) ABSTRACT

A method of testing the extended capabilities port of printers involves connecting D0~D3 with 4 status signal pins, D4~D7 to the control signal pins, and the rest of the status signal pins to one of the four connected status pins. The working conditions of data transmission of the data signal pins (D0~D7), the status signal pins (ERROR, ACK, BUSY, PE, SLCT), and the control signal pins (STROBE, AUTOFD, INT, SCLTIN) are then tested.

6 Claims, 2 Drawing Sheets

TESTING METHOD FOR EXTENDED CAPABILITIES PORT OF PRINTERS AND FIXTURE THEREOF

FIELD OF THE INVENTION

The invention pertains to method of testing a port and fixture thereof, and more specifically to a method of testing the extended capabilities port of printers and fixture thereof.

BACKGROUND OF THE INVENTION

In most computers, the Serial Port (COM Port) and Parallel Port are used to communicate with the outside world. The Parallel Port is also used to connect printers, and it is also known as the Line Printer Port (LPT Port). The Parallel Port, which transmits 8 bits of data at a time, is much faster than the Serial Port, which only transmits 1 bit at a time. However, the Parallel Port is generally used for short distance transmission because of the need of increasing data lines. Besides, the Line Printer Port can also be used to transmit data between two computers for short distance purposes.

Generally, there are 25 pins in a printer port. 17 of them (except 8 grounds, PIN 18~PIN 25) are defined as follows:
1. Input: includes 5 STATUS signal pins, ACK (PIN 10), BUSY (PIN 11), PE (PIN 12), SLCT (PIN 13), and ERROR (PIN 15). They are used to input STATUS signals to computers.
2. Output: includes 4 CONTROL signal pins, STROBE (PIN 1), AUTOFD (PIN 14),INT (PIN 16). SCLTIN (PIN 17). They are used to output CONTROL signals from computers.
3. Input/Output: includes 8 data pins, D0 (PIN 2), D1 (PIN 3), D2 (PIN 4), D3 (PIN 5), D4 (PIN 6), D5 (PIN 7), D6 (PIN 8), D7 (PIN 9). They are used to receive and transmit data within computers.

With the traditional testing method there is no open circuit between input and output pins if the voltage level of the output signal of the output pin is equal to the voltage level of the input signal of the input pin. However, we can only test 10 out of 17 pins, the remaining pins are not testable. The traditional method also has the following disadvantages:
1. Short circuit between D5 (or D7) and the ground is undetectable.
2. Short circuit between any two pins between D0 and D7 is undetectable.
3. Short circuit between ACK and BUSY is undetectable.

Therefore, testing departments for printer ports have a variety of solutions for short circuit detection. For example, traditional testing method has a particular circuit, as in FIG. 1. First, we check the voltage of the connected PIN 2 (D0) and PIN 15 by increasing or decreasing the voltage. If the voltage levels of the two pins are the same, the data will be transmitted from PIN 2 properly. Therefore, we can test all pins by connecting PIN 15 to D0~D7. However, it is inefficient to test only one pin at a time, especially when we test the Extended Capabilities Port (ECP). Therefore, a solution to improve testing efficiency and simplify the testing procedure is necessary.

SUMMARY OF THE INVENTION

Based on the problems of traditional testing, the invention provides a new testing method of extended capability port of printers, which improves testing efficiency and simplifies the testing procedure.

The method of the invention involves connecting D0~D3 with four of the status signal pins, and connecting D4~D7 with the control signal pins. The rest of the status signal pins will connect with one of the four connected status signal pins.

The following steps are used to check the working condition of the data signal pins (D0~D7), the status signal pins (ERROR, ACK, BUSY, PE, SLCT), and the control signal pins (STROBE, AUTOFD, INT, SCLTIN):

Make the first group of D0~D3 and second group of D4~D7; make sure there is no short circuit between any pin of the first group and any pin of the second group;

Check if there is short circuit between D0~D3;

Check if there is short circuit between D4~D7;

Check if there is short circuit between PE and BUSY.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
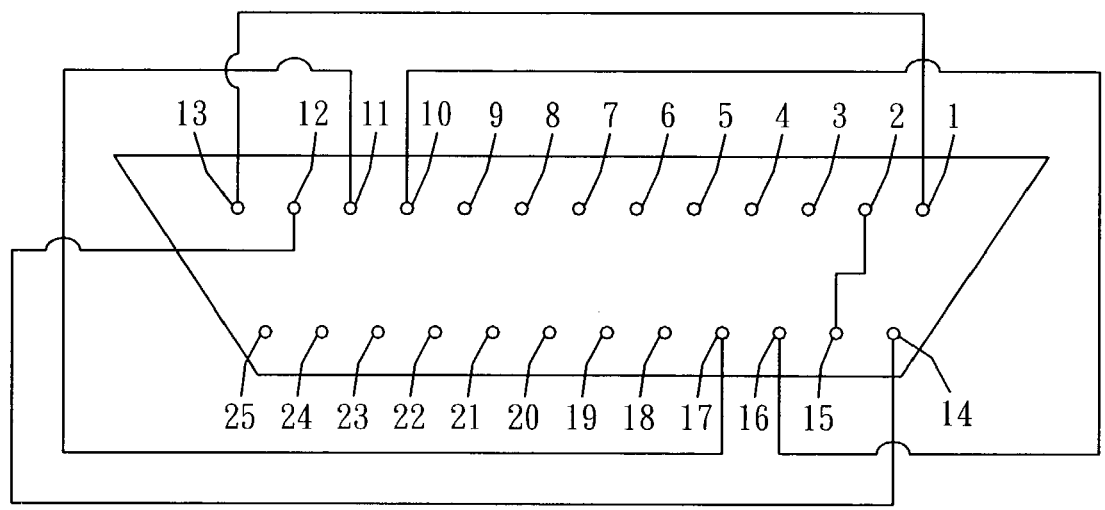
FIG. 1 illustrates the traditional testing procedure.

Generally, a printer port has 25 pins, 17 of them (excluding 8 grounds, PIN 18~PIN 25) are defined as follows (please refer to FIGS. 1 and 2 for a detailed circuit):
1. Input: includes 5 STATUS signal pins, ACK (PIN 10), BUSY (PIN 11), PE (PIN 12), SLCT (PIN 13), and ERROR (PIN 15). They are used to input STATUS signals into computers.
2. Output: includes 4 CONTROL signal pins STROBE (PIN 1), AUTOFD (PIN 14), INT (PIN 16), SCLTIN (PIN 17). They are used to output CONTROL signals from computers.
3. Input/Output: includes 8 DATA signal pins, D0 (PIN 2), D1 (PIN 3), D2 (PIN 4), D3 (PIN 5), D4 (PIN 6), D5 (PIN 7), D6 (PIN 8), D7 (PIN 9). They are used to receive and transmit data within computers.

Figure 2:
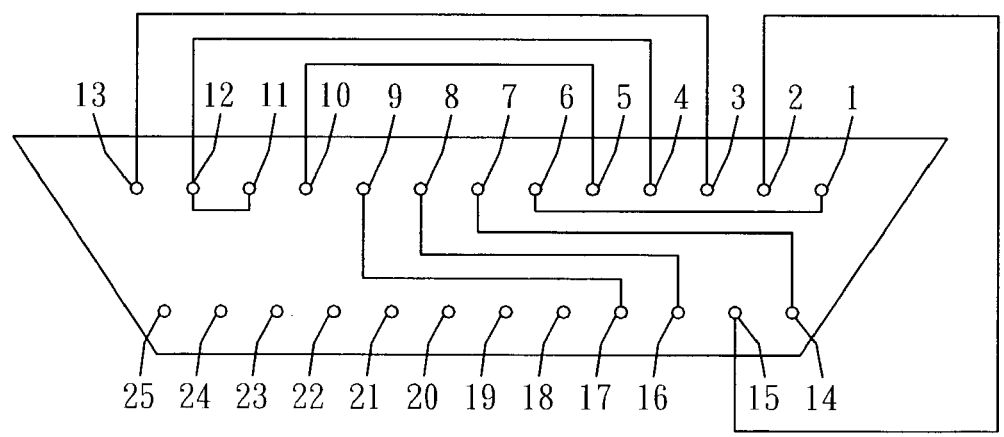
FIG. 2 illustrates the circuitry of the invention.

The object of the invention is to test the working condition of the data signal pins, the status signal pins, and the control signal pins. The method of the invention involves connecting D0~D3 with 4 of the status signal pins, and connecting D4~D7 to the control signal pins. The rest of the status signal pins are connected to one of the four connected status pins. In FIG. 2, PIN 2 (D0) is connected to PIN 15 (ERROR), PIN 3 (D1) is connected to PIN 13 (SLCT), PIN 4 (D2) is connected to PIN 12 (PE), PIN 5 (D3) is connected to PIN 10 (ACK), PIN 6 (D4) is connected to PIN 1 (STROBE), PIN 7 (D5) is connected to PIN 14 (AUTOFD), PIN 8 (D6) is connected to PIN 16 (INT), PIN 9 (D7) is connected to PIN 17 (SLCTIN), PIN 11 (BUSY) is connected to PIN 12 (PE), and Grounds (PIN 18~PIN 25) are not connected to any pin.

Figure 3:
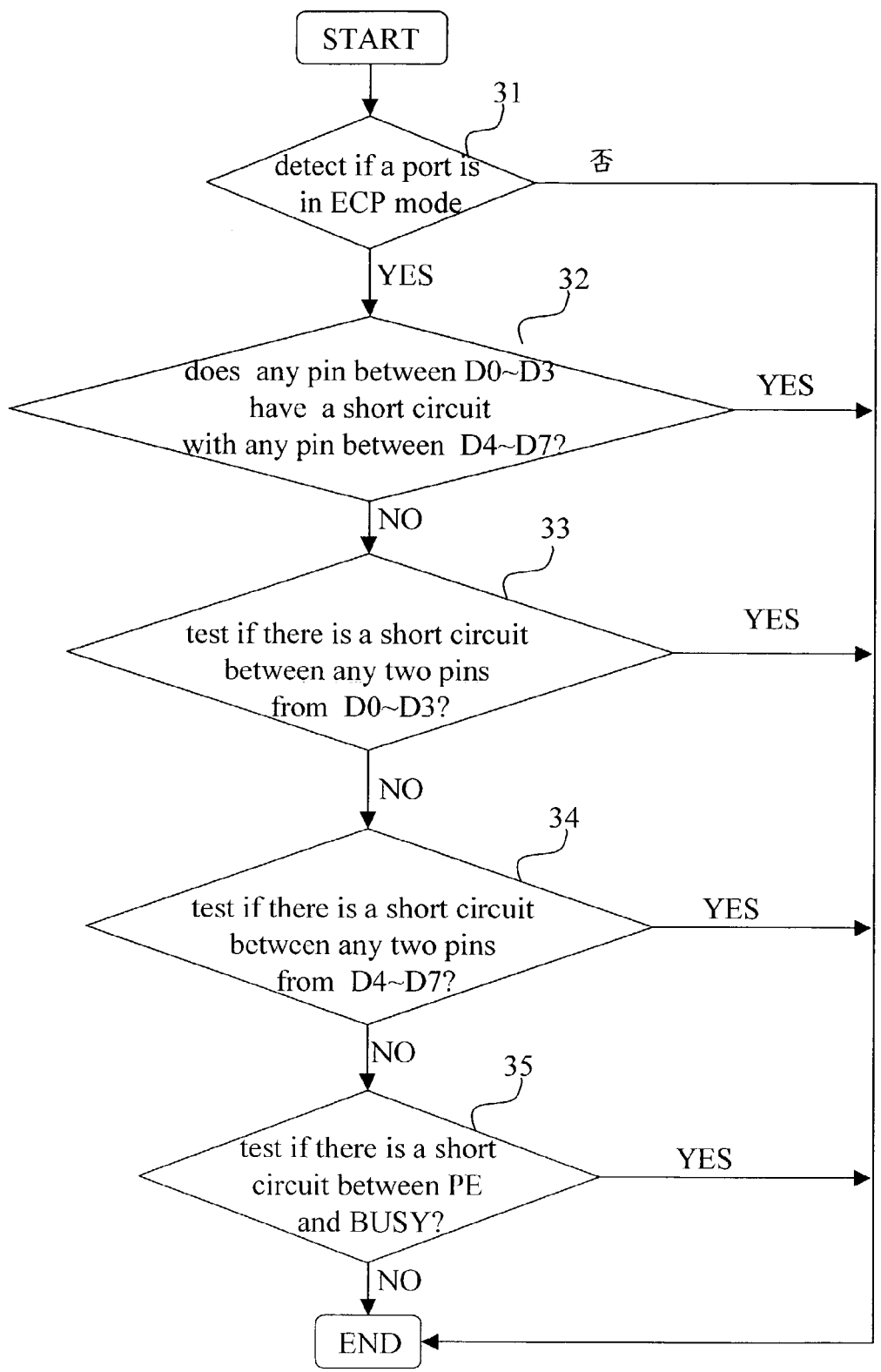
FIG. 3 illustrates the testing flow chart of the invention.

Please refer to FIG. 3 for a testing flow chart. First, detect if a printer port is in ECP mode (step 31). Then, make D0~D3 as a first group and D4~D7 as a second group. Check if there is a short circuit between any pin of the first group and any pin of the second group (step 32). If there is no short circuit, then check if there is a short circuit between group members of each group (step 33~34). Finally, check if there is a short circuit between PE and BUSY.

The technique disclosed in the invention enables a test mechanism for comparing the voltage level of input and output pins. It has the following effects:
1. It reduces the cost and quantity of features and test hours largely by using only one test feature.
2. It increases the production rate by increasing the testing coverage.
3. It tests each pin's ability to transmit data.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A testing fixture for extended capabilities printer port by testing the data signal pins (D0~D7), the status signal pins (ERROR, ACK, BUSY, PE, SLCT), and the control signal pins (STROBE, AUTOFD, INT, SCLTIN), the testing comprising:
   connecting D0~D3 to four of the STATUS signal pins;
   connecting D4~D7 to CONTROL signal pins; and
   connecting the rest of STATUS signal pin to one of the four STATUS signal pins.

2. The testing fixture as defined in claim 1, wherein the D0 pin is connected to the ERROR pin, the D1 pin is connected to the SLCT pin, the D2 pin is connected to the PE pin, the D3 pin is connected to the ACK pin, the D4 pin is connected to the STROBE pin, the D5 pin is connected to the AUTOFD pin, the D6 pin is connected to the INT pin, the D7 pin is connected to the SLCTIN pin.

3. The testing fixture as claim 1, wherein the BUSY pin is connected to the PE pin.

4. A testing method for extended capabilities printer port by testing the data signal pins (D0~D7), the status signal pins (ERROR, ACK, BUSY, PE, SLCT), and the control signal pins (STROBE, AUTOFD, INT, SCLTIN), the testing comprising:
   connecting the first to fourth DATA signal pins (D0~D3) to four of the STATUS signal pins, and connects the fifth to eighth DATA signal pins (D4~D7) to CONTROL signal pins, connects the rest of STATUS signal pin to one of the four connected STATUS signal pins;
   making D0~D3 as the first group and making D4~D7 as the second group, check for short circuit between any pin of the first group and any pin of the second group;
   checking for short circuit or open circuit between any two pins among D0 and D3;
   check for short circuit or open circuit between any two pins between D4 and D7; and
   checking for open circuit between PE and BUSY.

5. The testing method as claim 4, wherein the D0 pin is connected to the ERROR pin, the D1 pin is connected to the SLCT pin, the D2 pin is connected to the PE pin, the D3 pin is connected to the ACK pin, the D4 pin is connected to the STROBE pin, the D5 pin is connected to the AUTOFD pin, the D6 pin is connected to the INT pin, the D7 pin is connected to the SLCTIN pin.

6. The testing method as claim 4, wherein the BUSY pin is connected to the PE pin.

* * * * *